(12) United States Patent
Guenther

(10) Patent No.: US 8,624,777 B2
(45) Date of Patent: Jan. 7, 2014

(54) METHOD FOR DETERMINING THE DISTANCE BETWEEN A TRANSMITTER AND A RECEIVER

(75) Inventor: Christoph Guenther, Wessling (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 519 days.

(21) Appl. No.: 12/675,828

(22) PCT Filed: Sep. 29, 2008

(86) PCT No.: PCT/EP2008/063016
§ 371 (c)(1),
(2), (4) Date: Mar. 1, 2010

(87) PCT Pub. No.: WO2009/043835
PCT Pub. Date: Apr. 9, 2009

(65) Prior Publication Data
US 2010/0309043 A1     Dec. 9, 2010

(30) Foreign Application Priority Data
Sep. 29, 2007   (EP) .................................... 07019227

(51) Int. Cl.
*G01S 19/43* (2010.01)
*G01S 19/44* (2010.01)

(52) U.S. Cl.
USPC .............................. 342/357.26; 342/357.27

(58) Field of Classification Search
USPC ............. 342/357.26, 357.27, 357.46, 357.72; 701/468, 477
See application file for complete search history.

(56) References Cited

U.S. PATENT DOCUMENTS

| 6,266,009 B1 | 7/2001 | Hwang |
| 2005/0212696 A1 | 9/2005 | Bartone et al. |

OTHER PUBLICATIONS

McGraw, G.A., "Generalized Divergence-Free Carrier Smoothing with Applications to Dual Frequency Differential GPS", Jan. 2006, Proceedings of Ion NTM, XX, XX, pp. 293-300.

Henkel et al., "Precise Point Positioning with Multiple Galileo Frequencies", May 2008, Position, Location and Navigation Symposium, pp. 592, 594.

Konno et al., "Evaluation of Two Types of Dual-Frequency Differential GPS Techniques under Anomalous Ionosphere Conditions", Jan. 2006, Proceedings of the National Technical Meeting of the Institute of Navigation, pp. 735-747.

International Search Report for corresponding application No. PCT/EP2008/063016 dated Jan. 13, 2009.

*Primary Examiner* — Dao Phan
(74) *Attorney, Agent, or Firm* — Renner, Otto, Boisselle & Sklar, LLP

(57) ABSTRACT

The present invention relates to a multiple carrier smoothing method for navigation satellite signals, in particular a three carrier smoothing method for Galileo signals. It provides a smoothed code solution, which is ionosphere-free to the first order and whose noise is reduced to sub-decimeter level. The method involves integer ambiguities, which can be resolved reliably. The sensitivity of the new method to receiver biases and ionospheric delays of the second order is small. The performance of the three carrier smoothing method allows to reduce the averaging interval to ⅕-th of its current standard value. The results refer to pseudo ranges and are geometry independent.

16 Claims, 1 Drawing Sheet

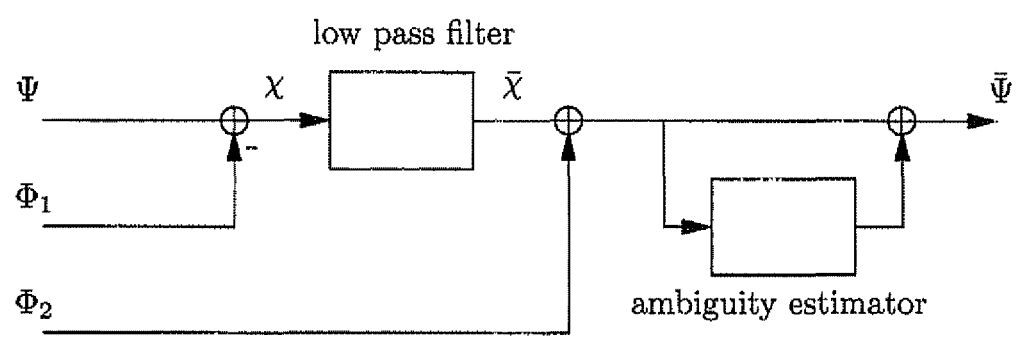

US 8,624,777 B2

METHOD FOR DETERMINING THE DISTANCE BETWEEN A TRANSMITTER AND A RECEIVER

This application is a national phase of International Application No. PCT/EP2008/063016 filed Sep. 29, 2008 and published in the English language.

BACKGROUND

The present invention relates to a method for determining the position of a receiver using signals transmitted, e.g. by a constellation of satellites. The receiver is typically located at low altitudes. In particular, the receiver can be located in an aircraft for navigating during final approach and even for landing the aircraft, in a ship or a vehicle moving over ground. More particularly, the present invention relates to a reduced-noise ionosphere-free smoothing of ranging codes.

Satellite navigation is part of nowadays daily life and is used for an increased number of applications. The signals transmitted by the satellites and received by receivers comprise at least one ranging code modulated on at least one carrier. The ranging code is a sequence of binary values, called chips. The rate of the ranging code is of the order of a few Mchips/s, and the frequency of the carrier signal is of the order of GHz. Under ideal conditions, the ranging code is suitable for determining the code phase with an accuracy of the order of 1/1000 of a chip. The ranging code is furthermore modulated by information that allows determining the time of transmission. The combination of the two pieces of information is the basis for the estimation of the distance between the transmitter and the receiver.

Real signals are delayed by an unknown delay in the ionosphere, and are corrupted by multipath propagation to name but a few. The code phase, i.e., the delay determined by the ranging code is rather affected by multipath and is also rather noisy. Both are much less the case for the carrier phase. The carrier phase is the phase of the periodic carrier oscillation. It repeats after one wavelength, which often is of an order of a few centimeters. "Smoothing" using a Hatch filter is a known method which takes advantage of the less affected ambiguous carrier signal for improving the quality of the code phase estimation. The traditional Hatch filter subtracts the carrier phase from the code phase, filters the so obtained signal, and then restores the carrier contribution.

In this connections carrier smoothing is one of the known methods for reducing noise variance. Carrier smoothing is used today for safety critical applications, like navigation of aircraft during flight and early final approach.

The problem in satellite navigation is that due to disturbance in the ionosphere unexpected and unforeseeable stochastic delays occur. In order to eliminate ionosphere induced errors, the use of code combinations and carrier combinations n the smoothing are desirable. All code combinations considered so far have, however, increased the noise variance. Due to this increased noise variance, the known carrier smoothing concepts cannot be used for high security applications like navigation of an aircraft during late final approach and landing phase.

Accordingly, what is needed is a reduced-noise ionosphere-free carrier smoothing with increased performances.

SUMMARY OF THE INVENTION

The present invention provides a method for determining a more reliable position of a receiver, when the signals are potentially affected by the ionosphere, multipath, and other phenomena that draw an advantage out of smoothing, wherein the receiver uses signals on at least three different frequencies.

The present invention provides a method for determining the distance between a transmitter located above the ionosphere and a receiver located below the ionosphere, wherein the receiver receives from the transmitter a signal comprising a carrier signal having a carrier frequency and modulated by at least three coded signals having three different frequencies with the coded signals including information representing the distance between the transmitter and the receiver with a certain inaccuracy, wherein the method comprises creating a linear combination of the at least three coded signals at a predetermined time so as to obtain a combined pseudo range signal including a relatively inaccurate information of the distance at said predetermined time wherein the combined pseudo range signal is substantially free of ionosphere induced errors, for each modulated frequency signal, determining the phase shift, creating a first linear combination of the at least three phase shifts at said predetermined time so as to obtain a first combined phase shift signal comprising an information of the phase shift and, accordingly, an accurate information of the distance with however ambiguities expressed as a rational multiplicity of the three wavelengths, forming a differential combined signal which results from the difference between the combined pseudo range signal and the first combined phase shift signal, low pass filtering the differential combined signal for reducing noise so as to obtain a filtered differential combined signal, creating a second linear combination of the at least three phase shifts at said predetermined time so as to obtain a second combined phase shift signal comprising an information of the phase shift at said predetermined time and, accordingly, an accurate information of the distance with however ambiguities expressed as a rational multiplicity of the three wavelengths, wherein the second combined phase shift signal includes a distance information which is identical to the distance information of the first combined phase shift signal, adding the second combined phase shift signal to the filtered differential combined signal so as to obtain a summing signal, wherein parameters describing the linear combination of the at least three coded signals and the first and second combinations of the at least three phase shifts are chosen such that (i) a combination of the ambiguities of the first and second combined phase shift signals result in a single ambiguity expressed as an integer multiplicity of an analytic combined wavelength, (ii) the noise variance is reduced, and (iii) the ratio of the single ambiguity and the noise variance is increased, resolving the single ambiguity through an ambiguity estimator to which the summing signal is fed, and determining the distance based on the output signal of the ambiguity estimator.

In a certain embodiment of the present invention there is provided a method as mentioned before wherein resolving the single ambiguity is only performed after the beginning of the receipt of a signal from the transmitted and the receiver tracks the received signal so that after a certain period of time no ambiguity resolution is necessary any longer.

According to another aspect of the present invention there is provided a method as defined before wherein the ambiguity resolution comprises a least square resolution and a rounding.

The method according to the invention can be used for satellite navigation and for satellite navigation during late landing phase of an aircraft, navigating of ships, automated control of objects moving over ground.

The present invention is based on the idea to use linear combinations of at least three carrier signals before and after the filtering of the code signal. Better than state of the art results are obtained, when the carrier combinations before and after the filter are the same, and both the code and carrier combinations are geometry preserving, ionosphere free, and optimized to achieve a minimum variance. This can be further improved by allowing the combination before and after the filter to be different. However, this introduces an integer ambiguity between the phase signal combination used before and after the filter, which must be estimated in addition to the position, and the offset of the local clock. There is some freedom in the choice of the linear combination, which is used to maximize the wavelength associated with the difference of the linear combination before and after the filtering. This greatly simplifies the estimation of the ambiguity. One possible implementation is to setup a linear equation describing for the linear combination considered and another ionosphere free smoothed solution, which uses the same carrier combinations before and after the filter. This system of equations can be solved by the least square method. The non-integer approximations of the ambiguities are then rounded to the nearest integer. The resulting probability of wrong detection is rather low, and the variance of the position also.

By introducing a further linear combination of the at least three phase shifts a system of equations is created which is over-determined so that the chose of the parameters used for the linear combinations for obtaining the pseudo range signal and the first and second combined phase shift signals can be optimized. One of the conditions for the first and second combined phase shift signals is that they include exactly the same distance information at the same point of time. Another condition is that the combination of the ambiguities of the frequencies results in a single ambiguity expressed in an integer multiplicity of an analytic combination wavelength. Accordingly, the signal resulting from the addition of the second combined phase shift signal to the filtered signal still includes ambiguities. However, when choosing the parameters of the linear combinations such that the combination wavelength is rather high and, in particular, the ratio of the combination wavelength and the noise variance is rather high, resolving the ambiguity is facilitated.

In a further rather broad sense the present invention provides a method for estimating the position of a receiver using radio signals, consisting of at least one ranging code modulated on at least three carriers, wherein the method comprises
estimating the delay of each code,
estimating the phase of each carrier,
combining the code delay estimates,
smoothing the resulting combination using a combination of at least three carrier phases, which means subtracting a phase combination from the code combination, filtering, and finally adding a phase combination.

In another aspect, the invention relate to a method for estimating the position of a receiver obtained by smoothing a linear combination of at least three code based delay measurements by at least three carrier phase measurements comprising
an ionosphere-free geometry-free linear combination of at least three code based delay measurements and at least three carrier based measurements,
a filtering of the above linear combination,
an ionosphere-free geometry-preserving linear combination of at least three carrier phase measurements,
an estimation of the ambiguity, i.e. an estimation of the integer number of multiples of the wavelengths inherent in the smoothed results, and
a determination of the position using the above smoothed linear combination of delay measurements.

In this embodiment the following has to be taken into consideration (if necessary):
an ionosphere-free, geometry-free linear combination of at least three code based delay measurements and at least three carrier based measurements—in the present case ionosphere-free means $\gamma(a+\alpha_1, b+\beta_1, c+\gamma_1)$, and geometry-free means $a+b+c-\alpha_1-\beta_1-\gamma_1$,
an ionosphere-free, geometry-preserving linear combination of at least three carrier phase measurements, in the present case ionosphere-free means $\gamma(\alpha_2, \beta_2, \gamma_2)$, and geometry preserving means $\alpha_2+\beta_2+\gamma_2=1$.

Further embodiments of the present invention are shown in the attached claims.

BRIEF DESCRIPTION OF THE DRAWING

FIG. 1 shows schematically the generalized carrier smoothing setup according to the invention, wherein different carrier combinations are used in the smoothing process and the recovery of the pseudorange.

DETAILED DESCRIPTION

1. Introduction

The smoothing of ranging codes using carrier signals is a popular approach to reduce code noise and code multipath. It was introduced by Hatch and is used in the Wide Area Augmentation System (WAAS), as well as in the European Geostationary Navigation Overlay Service (EGNOS). It is also considered for Ground Base Augmentation Systems (GBAS). Traditional code smoothing has the inconvenience that the ionospheric delay affects the code and carrier phase with opposite signs. Long smoothing intervals and large ionospheric delays are correspondingly both critical factors when applying this method. Two alternative approaches address this issue. They are based on dual-frequency measurements and were introduced by Hwang et al. and Mc. Graw et al. They are called ionospheric-free and divergence-free smoothing, respectively. The availability of an aeronautical CAT III type of navigation service using these smoothing approaches was analyzed by Konno et al. Their analysis shows that the noise enhancement of the ionosphere-free smoothing is so significant that it does not meet current specifications. Divergence-free smoothing often performs better but also implies that service requirements are relaxed in order to achieve an acceptable availability. In the present paper, an alternative three-frequency approach for Galileo signals is introduced and analyzed. It promises to meet all requirements considered so far. The next section summarizes and comments the state of the art, Section 3 introduces and analyzes the new algorithm, Section 4 describes the resolution of the integer ambiguity inherent in the new algorithm, Section 5 discusses the handling of the bias contribution associated with the user equipment, Section 6 extends the analysis to satellite dependent biases, and Section 7, finally, analyzes the impact of second order ionospheric corrections.

2. Known Carrier Smoothing Algorithms

The presentation in this section builds on the work of Hwang, Mc. Graw, Bader, Young and Hiro. The notations of these authors are used throughout the papers. Let $\Psi$ and $\Phi$ denote the code and carrier measurements, respectively, then $\chi = \Psi - \Phi$ contains noise and multipath and is the quantity that is being smoothed in a variant of a Hatch Filter. The filter considered has the form:

$$\bar{\chi}(t+1) = \left(1 - \frac{1}{\tau}\right)\bar{\chi}(t) + \frac{1}{\tau}\chi(t+1), \quad (1)$$

with $\tau$ being the smoothing time constant in terms of number of samples. Typically, samples are collected during 100 [s] at a rate of one sample per second. The solution of Equation (1) can be derived easily both for finite and infinite sets of measurements. The solution for the infinite set of measurements is given by:

$$\bar{\chi}(t) = \frac{1}{\tau}\sum_{n=0}^{\infty}\left(1 - \frac{1}{\tau}\right)^n \chi(t-n). \quad (2)$$

The slightly more complex solution for a set of measurements of size N converges rather quickly to the above solution for $N \to \infty$. If $\chi$ is assumed to be stationary additive white gaussian, the noise variance for $N \to \infty$ becomes:

$$E[\bar{\chi}^2(t)] = \frac{1}{2\tau - 1} E[\chi^2(t)].$$

The noise variance for large but finite N is within 2% of this value when the measurement set has reached a size of at least $N \geq 2\tau$. In the case of stationary white noise, the ideal averaging would be:

$$\bar{\chi}(t) = \frac{1}{t}\sum_{n=0}^{t-1} \chi(t-n).$$

Its noise variance $$E[\bar{\chi}^2(t)] = \frac{1}{t} E[\chi^2(t)]$$

tends to 0 as time goes to infinity. Nevertheless, the former averaging has been preferred so far, since it is capable to adapt to changing conditions, i.e. situations that are not perfectly stationary.

The filters considered express the smoothed output $\Psi_S$ in terms of the carrier measurement $\Phi$ and the low pass filtered combination $\chi$ in the form:

$$\Psi_S(t+1) = \Phi(t+1) + \bar{\chi}(t+1) \quad (3)$$

$$= \frac{1}{\tau}\Psi(t+1) + \left(1 - \frac{1}{\tau}\right)(\Psi(t) + \Phi(t+1) - \Phi(t)).$$

Note that in the last term of this equation $\bar{\Phi}(t)$—the phase filtered according to Equation (2)—is to be used and not $\Phi(t)$. Next, generic expressions for $$\Psi = r + I_\Psi + \eta \quad (4)$$

$$\Phi = r + I_\Phi + \nu + \epsilon \quad (5)$$

are introduced, with r denoting the range and all quantities that behave similarly, including the tropospheric delay, and biases; with $I_\Psi$ and $I_\Phi$ denoting the ionospheric delay of the code and phase components, respectively; with $\eta$ denoting the code multipath and noise; and $\epsilon$ denoting the corresponding quantities for the carrier. The quantity $\nu = \lambda N$ finally denotes the offset due to the carrier phase ambiguity N. The carrier noise $\epsilon$ is sometimes neglected in the literature. This shall also be the case in the present section, but not in the subsequent ones. Throughout the paper, all noise components are treated mathematically as if they were Additive White Gaussian Noise (AWGN). These noise models might be gaussian overbounds for the real noise. The choice of the variance will be such that it includes multipath, as well.

Substituting (4) and (5) into Equation (3) leads to the desired expression for the smoothed code:

$$\Psi_S(t+1) = \frac{1}{\tau}(r(t+1) + I_\Psi(t+1) + \eta(t+1)) +$$

$$\left(1 - \frac{1}{\tau}\right)(\bar{r}(t) + \bar{I}_\Psi(t) + \bar{\eta}(t) + r(t+1) + I_\Phi(t+1) +$$

$$\nu + \epsilon(t+1) - \bar{r}(t) - \bar{I}_\Phi(t) - \nu - \bar{\epsilon}(t))$$

$$= r(t+1) + \bar{\eta}(t+1) + \left(1 - \frac{1}{\tau}\right)(\epsilon(t+1) - \bar{\epsilon}(t)) +$$

$$\bar{I}_\Psi(t+1) + \left(1 - \frac{1}{\tau}\right)(I_\Phi(t+1) - \bar{I}_\Phi(t)).$$

A closer look at these equations, leads us to the following observations and conclusions:

- The presence of $\bar{\Phi}(t)$ in Equation (3) is crucial. It prevents a dependency on the range history.
- The phase noise occurs both smoothed $\epsilon$ and unsmoothed $\bar{\epsilon}$. In a classical setting, it is much smaller than the code noise (2 mm versus 65 cm) and is therefore neglected.
- The ambiguity does not depend on time as long as no cycle slip occurs. Note that $\Phi$ can take any value compatible with the geometry and the offset inherent in the ambiguity.
- Any dependence of $\Psi$ on the phase of the signals would lead to an unresolved ambiguity.
- Any dependence of $\Phi$ on the code would produce unsmoothed noise contributions.

Three different types of carrier smoothing have been considered so far, which can all be derived from the above equations:

1) Traditional single frequency carrier smoothing: In this case $\Psi = \rho$, $\Phi = \phi$, and $I_\Psi = -I_\Phi = I$:

$$\rho_S(t+1) = r(t+1) + \bar{\eta}(t+1) + \bar{I}(t) - \left(1 - \frac{1}{\tau}\right)(I(t+1) - \bar{I}(t)),$$

i.e. the smoothed pseudorange is fully affected by the ionosphere and even worse: it is influenced by changes in the ionosphere.

2) Divergence-free dual frequency smoothing: In this case, the ionospheric phase delay is double compensated, in order to match it with the ionospheric code delay: $\Psi=\rho$, $$\Phi = \phi_1 + \frac{2}{\alpha}(\phi_1 - \phi_2),$$

$\alpha=f_1^2/f_2^2-1$. With $I_1-I_2=\alpha I_1$ the ionospheric contributions become $I_\Psi=I_\Phi=I$:

$$\rho_S(t+1)=r(t+1)+\bar{\eta}(t+1)+I(t+1),$$

i.e. the smoothed pseudorange is only affected by the instantaneous ionosphere.

3) Ionosphere-free smoothing: In this case $$\Psi = \rho_1 + \frac{1}{\alpha}(\rho_1 - \rho_2), \Phi = \phi_1 + \frac{1}{\alpha}(\phi_1 - \phi_2),$$

and $$\rho_S(t+1)=r(t+1)+\bar{\eta}(t+1),$$

i.e. the smoothed pseudorange is no longer affected by the ionosphere but the noise is enhanced to the value:

$$\bar{\eta} = \left(1+\frac{1}{\alpha}\right)\bar{\eta}_1 - \frac{1}{\alpha}\bar{\eta}_x,$$

with the subscript x denoting the second carrier. GPS currently transmits signals on the L1 carrier at $f_1=154f_0$, and on the L2 carrier at $f_2=120f_0$, with $f_0=10.23\cdot10^6$ MHz. Modernized GPS will provide an additional signal at $f_5=115f_0$. The noise enhancement factor becomes 2.98, and 2.59 for the combinations of L1/L2 and L1/L5, respectively. This noise enhancement overcompensates the advantage of an eliminated ionosphere as shown by Konno et al. The combination of divergence-free and ionosphere-free filters provides a certain level of availability for a Vertical Alert Limit (VAL) of 10 m. The use of L5 should further improve the situation somewhat, especially due to the reduced noise of the broadband signal. However, even under these circumstances, the L1/L5 combination will not meet the requirements considered by EUROCAE or the requirements proposed by Schuster et al. for surface movement.

4) Three carrier ionosphere-free combination: Galileo provides three signals in the aeronautical bands. They are the MBOC signal on L1, and the equivalent of a BPSK(10) on the E5a ($115f_0$) and E5b ($118f_0$) carriers. This allows to consider combinations of three carriers:

$$\Psi = a\rho_a + b\rho_b + c\rho_1 \quad (6)$$

with the indices a, b, and 1 denoting the E5a, E5b, and L1 bands, respectively. If the reference for the ionosphere is chosen to be in the L1 band, and $g_a=(154/115)^2$, $g_b=(154/118)^2$ and $g_1=1$ then $$\Psi=(a+b+c)r+(ag_a+bg_b+cg_1)I+(a\eta_a+b\eta_b+c\eta_1)=(a+b+c)r+\Gamma(a,b,c)I+\eta \quad (7)$$

In this equation, the notations $\Gamma(a,b,c)=ag_a+bg_b+cg_1$ as well as $\eta=a\eta_a+b\eta_b+c\eta_1$ were introduced implicitly. Equation (7) implies that the following equations must hold in order to preserve the geometry and eliminate the ionosphere:

$$a+b+c=1$$

$$ag_a+bg_b+cg_1=0.$$

The additional degree of freedom introduced by the third carrier is used to minimize the variance $\bar{\eta}$. For later reuse, the coefficients that minimize the noise of the code combination are denoted by a', b', and c'. Similarly, a minimum noise, ionosphere-free carrier combination can be found. The coefficients that minimize the noise of the carrier phase combination are denoted by $\alpha'$, $\beta'$, and $\gamma'$. The difference between the two cases is that all phase variances are the same, while the code variances are related by $\sigma_{\rho_{a,b}}=\sigma_{\rho_1}/4$, which corresponds to the ratio of the Cramer-Rao bounds for bandwidths of 24 MHz (E5) and 4 MHz (L1), respectively. Small bandwidths were chosen in the present context in order to minimize the sensitivity to interference. In terms of performance, this represents a worst case. Increased bandwidths would improve the results. The optimal choice of the coefficients a', b', c', $\alpha'$, $\beta'$, $\gamma'$ is shown in the upper entry of Table I. A similar combination of phases involving L1 and L5/E5a, as well as L2 or E6 was considered by Hatch.

The standard deviation of the noise of the code combination is given by $\sigma_\Psi=2.22\sigma_{\rho_1}$, and is thus slightly smaller than in the two carrier L1/L5 case. Additionally, the variance of the Galileo L1 signal is 3 times smaller than the one of the GPS L1 signals, in the case of a filter bandwidth of 4 MHz. Therefore, the three code combination is a real improvement but not a breakthrough. The smoothed ionosphere-free code solution will be useful for the carrier phase ambiguity resolution needed later in the paper.

In the next section, we shall see that a different manner of performing smoothing leads to much more significant improvements. None of the known smoothing algorithms achieve both such low noise, while eliminating the 1st order ionospheric delay.

3. Multicombination Smoothing

The setting of the generalized carrier smoothing is shown in FIG. 1. It uses two different carrier combinations before and after the filter. The carrier combination before the filter is used to eliminate the geometry and together with the code combination also the ionosphere in the smoothing process. The carrier combination after the smoothing filter restores the geometry and keeps the result ionosphere-free. The use of different carrier combinations leads to an integer ambiguity that needs to be resolved. This can be done, however, as shall be discussed in the next section. The new setting can alternatively be interpreted as a code and carrier combination $\Psi-\Phi_1+\Phi_2$ smoothed by the carrier combination $\Phi_2$.

TABLE I

COEFFICIENTS FOR AN IONOSPHERE-FREE CODE COMBINATION SMOOTHED BY A TRADITIONAL HATCH FILTER.

| a | b' | c' | α' | β' | γ' |
|---|---|---|---|---|---|
| −2.59 | 1.5 | 2.09 | −0.84 | −0.48 | 2.31 |
| −10.89 | 10.87 | 1.03 | −0.84 | −0.48 | 2.31 |

THE UPPER SOLUTION MINIMIZES THE NOISE. THE LOWER SOLUTION IS NOISIER BUT LEADS TO A SMALLER INFLATION OF BIASES, AS WILL BE DISCUSSED IN LATER SECTIONS.

In the generalized setting, the smoothed code becomes:

$$\Psi_S(t+1) = \Phi_2(t+1) + \frac{1}{\tau}(\Psi(t+1) - \Phi_1(t+1)) + \left(1 - \frac{1}{\tau}\right)(\Psi(t) - \Phi_1(t)). \quad (8)$$

The smoothing algorithms described in the previous section are recovered in the case $\Phi_2 = \Phi_1$.

The three combinations $\Psi$, $\Phi_1$ and $\Phi_2$ described in the FIGURE are formed with the three codes (see Equation (6)) and carriers of the E5a, E5b and L1 bands:

$$\Phi_i = \alpha_i \phi_a + \beta_i \phi_b + \gamma_i \phi_1 \quad (9)$$

The substitution of the expressions for the carrier signals leads to $$\Phi_i = (\alpha_i + \beta_i + \gamma_i)r - \Gamma(\alpha_i, \beta_i, \gamma_i)I + (\alpha_i \nu_a + \beta_i \nu_b + \gamma_i \nu_1) + \epsilon_i$$

with the definition $\epsilon_i = \alpha_i \epsilon_a + \beta_i \epsilon_b + \gamma_i \epsilon_1$. Note that the ambiguities implicit in $\nu_a$, $\nu_b$, and $\nu_1$ do not depend on i—only their weighting depends on the index. The corresponding expressions for the codes are found in Equation (7). Substituting these two results in Equation (8) leads to $$\Psi_S(t+1) = \left[\alpha_2 + \beta_2 + \gamma_2 + \frac{1}{\tau}(a+b+c-\alpha_1-\beta_1-\gamma_1)\right]r(t+1) +$$
$$\left(1 - \frac{1}{\tau}\right)[a+b+c-\alpha_1-\beta_1-\gamma_1]\bar{r}(t) +$$
$$\Gamma(\alpha_1+a, \beta_1+b, \gamma_1+c)\left[\left(1-\frac{1}{\tau}\right)\bar{I}(t) + \frac{1}{\tau}I(t+1)\right] -$$
$$\Gamma(\alpha_2, \beta_2, \gamma_2)I(t+1) + (\alpha_2-\alpha_1)\nu_a + (\beta_2-\beta_1)\nu_b +$$
$$(\gamma_2 - \gamma_1)\nu_1 + \bar{\eta}(t+1) - \bar{\epsilon}_1(t+1) + \epsilon_2(t+1).$$

The first line of the result contains the desired terms. The second last lines includes the ambiguities, which shall be chosen to be an integer multiple of a combination wavelength. The noise in the last line shall be minimized. All other lines shall be chosen to vanish. The second line describes the dependency on the range history and the third and forth line are the ionospheric terms at the input and output of the filter. In detail, the conditions read:

$$\alpha_2 + \beta_2 + \gamma_2 = 1 \quad (10)$$

$$a+b+c-\alpha_1-\beta_1-\gamma_1 = 0 \quad (11)$$

$$\Gamma(\alpha_2, \beta_2, \gamma_2) = 0 \quad (12)$$

$$\Gamma(\alpha_1+a, \beta_1+b, \gamma_1+c) = 0 \quad (13)$$

$$(\alpha_2-\alpha_1)\nu_a + (\beta_2-\beta_1)\nu_b + (\gamma_2-\gamma_1)\nu_1 = \Lambda N \quad (14)$$

These equations lead to a simple equation for the smoothed code:

$$\Psi_S(t+1) = r(t+1) + \Lambda N + \bar{\eta}(t+1) - \bar{\epsilon}_1(t+1) + \epsilon_2(t+1) \quad (15)$$

which contains the desired pseudorange r(t+1), a single ambiguity N, a smoothed code noise $\bar{\eta}(t+1)$, and a smoothed first carrier combination noise $\bar{\epsilon}_1(t+1)$, and an unsmoothed second carrier combination noise $\epsilon_2(t+1)$.

Note that the same result could also have been obtained with the following generalization of the filter described in Equation (1):

$$\bar{\chi}(t+1) = (1-F(D))\bar{\chi}(t) + F(D)\chi(t+1),$$

with F(D) being a convergent power series in the delay operator D:tt−1. The only difference is that $\bar{\epsilon}_1(t+1)$, and $\bar{\eta}(t+1)$ would need to be computed using the generalized filter.

Equation (14) can be rewritten in the form:

$$(\alpha_2 - \alpha_1)\frac{\lambda_a}{\Lambda}N_a + (\beta_2 - \beta_1)\frac{\lambda_b}{\Lambda}N_b + (\gamma_2 - \gamma_1)\frac{\lambda_1}{\Lambda}N_1 = N.$$

A sufficient condition for the left hand side being an integer is that:

$$(\alpha_2 - \alpha_1)\frac{\lambda_a}{\Lambda} = i \in Z \quad (16)$$

$$(\beta_2 - \beta_1)\frac{\lambda_b}{\Lambda} = j \in Z$$

$$(\gamma_2 - \gamma_1)\frac{\lambda_1}{\Lambda} = k \in Z$$

Dividing each of the equations by the corresponding $\lambda$, summing using the Equations (10)-(11), and inverting leads to:

$$\frac{\Lambda}{1-(a+b+c)} = \frac{1}{\frac{i}{\lambda_a} + \frac{j}{\lambda_b} + \frac{k}{\lambda_1}}. \quad (17)$$

With $f_a = 115 f_0$, $f_b = 118 f_0$, and $f_1 = 154 f_0$ every possible wavelength becomes a fraction of $$\lambda_0 = \frac{c}{f_0} = \frac{299792458}{10.23 \cdot 10^6} = 29.3052 [m].$$

Thus, the wavelength $\Lambda$ will be a fraction of $\lambda_0(1-(a+b+c))$, see Equation (17). Since the ease of ambiguity resolution highly depends on the ratio of $\Lambda$ divided by the residual uncertainty about $\Psi_S(t+1)$, it is desirable that $\Lambda$ be as large as possible. Incidentally, this will be the case for certain choices of the tuple i, j, k. Define q by:

$$q = \frac{\frac{1}{\lambda_{11}}}{\frac{i}{\lambda_a} + \frac{j}{\lambda_b} + \frac{k}{\lambda_1}}$$

then under the assumption that i, j, k has been selected, $\Lambda$ can be eliminated from the above conditions:

$$\lambda_a(\alpha_2 - \alpha_1)/q + i\lambda_0(a+b+c) = i\lambda_0 \quad (18)$$

$$\lambda_b(\beta_2 - \beta_1)/q + j\lambda_0(a+b\alpha c) = j\lambda_0 \quad (19)$$

$$\lambda_1(\gamma_2 - \gamma_1)/q + k\lambda_0(a+b+c) = k\lambda_0 \quad (20)$$

The Equations (10)-(13) and (18)-(20) form a system of linear equations Ax=b that can be solved. Since there are 9 unknowns and 7 equations, the kernel has at least dimension 2. De facto it has dimension 3 in the examples considered. The solution is therefore a superposition of a solution of the inhomogeneous equation Ax=b and a linear combination of solutions of the homogenous equation Ay=0. If one first disregards the condition that the wavelength $\Lambda$ shall not be reduced too significantly, one would optimize the choice of the combination in such a way as to minimize the noise enhancement. Assuming that the noise of the different code and carrier samples are independent and white gaussian leads to the following expression $$\sigma_{\bar{\eta}}^2 = E[(\bar{\eta}(t+1) - \bar{\varepsilon}_1(t+1) + \varepsilon_2(t+1))^2] \quad (21)$$

$$= \frac{1}{2\tau - 1}((a^2 + b^2)\sigma_{c,a/b}^2 + c^2\sigma_{c,1}^2) +$$

$$\frac{1}{2\tau - 1}(\alpha_1^2 + \beta_1^2 + \gamma_1^2)\sigma_\phi^2 + (\alpha_2^2 + \beta_2^2 + \gamma_2^2)\sigma_\phi^2 -$$

$$2\frac{1}{\tau}(\alpha_1\alpha_2 + \beta_1\beta_2 + \gamma_1\gamma_2)\sigma_\phi^2$$

with $\sigma_{c,a/b}$, $\sigma_{c,1}$, and $\sigma_\phi$, denoting the code noise in the E5a/E5b and L1 bands, as well as the phase noise, respectively. The latter phase noise is assumed to be identical in all bands. The noise is a combination of thermal noise and multipath. The multipath components experienced at an aircraft receiver are significantly attenuated with respect to line of sight. This applies to reflections from both the ground and the aircraft itself. Steingaβ finds minimum attenuations of 14.2 dB in a combination of measurement campaigns and modeling. In a worst case scenario, where both occur and are not suppressed by any other mechanisms, this can lead to a phase error of up to 3.6°, which corresponds to a length of 2 mm. In the case of code noise, a similar investigation can be performed. For simplicity, it shall presently be assumed that the error can be controlled to 3 times the Cramer-Rao bound. Other assumptions would lead to slightly different numerical values. These assumptions together with Equation (21) define the metric for the determination of the coefficients $z^T = (a, b, c, \alpha_1, \beta_1, \gamma_1, \alpha_2, \beta_2, \gamma_2)$:

The coefficients $c_i$, which describe the weighting of the solutions $y^{(j)}$ of the system of homogeneous equations $Ay^{(j)} = 0$ associated with the linear equations (10)-(13) and (18)-(20), i.e. $Ax = b$ are then chosen to minimize maximizing the wavelength $\Lambda$,
maximizing the ambiguity discrimination $\Lambda/(2\sqrt{\xi})$, or
minimizing the noise variance $\xi$.

The first result in Table II was obtained by maximizing the discrimination, and the second one by maximizing the wavelength. Both solutions substantially suppress noise. This is best visualized in the components a,b,c of the solution vector z. In a conventional ionosphere-free smoothing—involving E5b and L1—these coefficients would be b=1.422 and c=2.422. The biases, discussed in later sections, are reduced as well.

Another strength of the proposed algorithms is that an excellent performance is already obtained for the small values of $\tau$=20.

4. Ambiguity Resolution

The resolution of the ambiguities is performed by relating the smoothed pseudorange measurements through the navigation equations $$\Psi_S = H\xi + \Lambda N + \bar{\eta} \quad (22)$$

This is a set of k equations, in which H is the geometry matrix, described below; $\Psi_S$ is the tupel of linear combination of smoothed measurements; $\bar{\eta}$ is the tupel of associated noise components; N is the tupel of ambiguities; and $\xi$ is the space-time vector $$\xi = \begin{pmatrix} \bar{r} \\ c\delta \end{pmatrix}.$$

In this last equation $\bar{r}$ is the user's position, and $\delta$ his clock offset. The geometry matrix is given by

TABLE II

TWO SOLUTIONS FOR DIFFERENT VALUES OF τ.

$$\left\| x + \sum_j c_j y^{(j)} \right\|_w^2 = \min.$$

| i | j | k | τ | Λ[m] | noise √ξ[cm] | Λ/(2√ξ) | bias [cm] | a | b | c | $\alpha_1$ | $\beta_1$ | $\gamma_1$ | $\alpha_2$ | $\beta_2$ | $\gamma_2$ |
|---|---|---|---|---|---|---|---|---|---|---|---|---|---|---|---|---|
| 4 | −5 | 1 | 20 | 3.15 | 3.8 | 41 | 1.5 | −0.89 | −0.72 | 0.038 | −51.6 | 64.5 | −14.4 | −2.25 | 1.12 | 2.13 |
| 8 | −9 | 1 | 100 | 3.18 | 2.2 | 71 | 1.2 | −0.30 | −0.010 | 0.008 | −101.2 | 115.3 | −14.5 | −1.35 | 0.099 | 2.25 |

THE FIRST SOLUTION WAS DETERMINED WITHOUT SPECIAL CONSIDERATION OF BIASES. IT USES THE FIRST AUXILIARY SOLUTION OF TABLE I FOR FIXING THE AMBIGUITY. THE INCREASED AVERAGING CONSTANT τ = 100 OF THE SECOND SOLUTION WAS PARTIALLY USED TO REDUCE THE BIAS OF THE SOLUTION, SEE LATER SECTIONS. IN THIS CASE, THE AMBITUITY FIXING IS BASED ON THE SECOND SOLUTION OF TABLE I.

Using the definition of the matrix $$Y_{ij} = -y_i^{(j)},$$

the condition can be rewritten in the form
which is a least square problem with the solution:

$$c = (Y^T W Y)^{-1} Y^T W x.$$

This completes the first part of the solution. Using c, one can compute $z = x - Yc$, and using z, the noise term $\xi = z^T W z$ and the wavelength $\Lambda$. The space of values of (i,j,k) can be searched with the criteria of $$H = \begin{pmatrix} (\bar{e}^1)^T & 1 \\ \vdots & \vdots \\ (\bar{e}^k)^T & 1 \end{pmatrix},$$

with $\bar{e}^i$ being the unit vector pointing from the satellite i towards the user location. The matrix only weakly depends on the current position, and is correspondingly determined from an unsmoothed code solution. In the case of extreme accuracy requirements, one might use the solution to recompute H.

Note that all statements below also hold if the wet tropospheric delay was estimated as well. This would add a variable for the vertical wet delay to $\xi$, and Niell mapping components to the geometry matrix H. Due to the strong correlation between the vertical position, the clock offset, and the tropospheric wet delay, this option is mainly considered for reference stations. The dry component of the tropospheric delay can be modeled to millimeter accuracy, see Elgered.

Equation (22) does not involve any differences amongst satellites. The statistics of the various satellite noise components are therefore independent in a mathematical sense. The dimensionality of H is k×m with m being the dimensionality of $\xi$, and k being the number of satellites. The system of Equation (22) has thus m unknown components from $\xi$ and k unknown ambiguities N. Correspondingly, there are in more variables than equations.

The ionosphere-free code combination considered in Section 2 provides another k equations. Including these equations, allows to solve the system. Since the code combination from Section 2 is rather noisy, it is smoothed using a traditional Hatch filter. Let $\psi$ and $\phi$ denote the associated code and carrier combinations:

$$\psi = a'\rho_a + b'\rho_b + c'\rho_1$$

$$\phi = \alpha'\phi_a + \beta'\phi_b + \gamma'\phi_1,$$

then the condition for the solution, to be geometry preserving, ionosphere-free, and to have the least noise variance leads to the previously derived solutions, see Table I. The noise variance of these solutions is low enough (21.3 cm in the case $\tau=20$ [s] for the upper solution, and 16.9 cm in the case $\tau=100$ [s] for the lower solution) to resolve the ambiguity with a very low probability of wrong fixing, as shall be seen below. The combined equations now read:

$$\begin{pmatrix} \Psi_S \\ \psi_S \end{pmatrix} = \begin{pmatrix} H & \Lambda 1^T \\ H & 0 \end{pmatrix} \begin{pmatrix} \xi \\ N \end{pmatrix} + \begin{pmatrix} \overline{\eta} \\ \overline{\eta}' \end{pmatrix}, \quad (23)$$

with $\Psi_S$, denoting the k-tupel of desired code and carrier combinations and $\psi_S$, $\overline{\eta}$, $\overline{\eta}'$, N, as well as 1 denoting the corresponding tupels of auxiliary smoothed code combinations, the noise terms of the combinations, the ambiguity of the desired combination, and the tupel of ones. The crosscorrelation matrix of the noise $\Sigma$ has the simple form $$\Sigma = \begin{pmatrix} \sigma_{\overline{\eta}}^2 11 & \sigma_{\overline{\eta}\overline{\eta}}^2 11 \\ \sigma_{\overline{\eta}\overline{\eta}}^2 11 & \sigma_{\overline{\eta}}^2 11 \end{pmatrix},$$

with 11 being a k×k identity matrix and $\sigma_{\overline{\eta}}^2$ being determined by Equation (21). The remaining elements are given by $\sigma_{\overline{\eta}}^2 = z'^T W z'$, and $\sigma_{\overline{\eta}\overline{\eta}}^2 = z'^T W z = z'^T W z'$, with z' being defined through $z'^T = (a',b',c',\alpha',\beta',\gamma',\alpha',\beta',\gamma')$. The duplication of the phase coefficients in the last three components of the tupel z' is a consequence of using the same phase combination before and after the filter for the auxiliary solution.

Let Equation (23) be rewritten in the simplified form $$\Psi = M\Xi + \eta \quad (24)$$

then the float solution is obtained by solving the weighted least square problem with the weights $\Sigma^{-1}$, i.e., $\hat{\Xi} = (M^T\Sigma^{-1}M)^{-1}M^T\Sigma^{-1}\Psi$. Since $\eta$ is zero mean, gaussian distributed with variance $\Sigma$, this implies that $\Delta\Xi = \hat{\Xi} - \Xi$ is also zero mean, gaussian distributed with variance $(M^T\Sigma^{-1}M)^{-1}$. The distribution of $\Delta\Xi$ is thus given by $$p(\Delta\Xi) = \frac{1}{\sqrt{(2\pi)^{k+m}\det\left(\left(M^T\Sigma^{-1}M\right)^{-1}\right)}} \exp\left(-\frac{1}{2}|\Delta\Xi|^2_{M^T\Sigma^{-1}M}\right). \quad (25)$$

The special form of M and $\Sigma$ allows to compute:

$$M^T\Sigma^{-1}M = \frac{1}{\sigma_{\overline{\eta}}^2\sigma_{\overline{\eta}}^2 - \sigma_{\overline{\eta}\overline{\eta}}^4}\begin{pmatrix} (\sigma_{\overline{\eta}}^2 + \sigma_{\overline{\eta}}^2 - 2\sigma_{\overline{\eta}\overline{\eta}}^2)H^T H & (\sigma_{\overline{\eta}}^2 - \sigma_{\overline{\eta}\overline{\eta}}^2)H^T \Lambda \\ (\sigma_{\overline{\eta}}^2 - \sigma_{\overline{\eta}\overline{\eta}}^2)\Lambda H & \sigma_{\overline{\eta}}^2 \Lambda^2 11 \end{pmatrix}. \quad (26)$$

Define $\Delta\xi = \hat{\xi} - \xi$, and $\Delta N = \hat{N} - N$, i.e.:

$$\Delta\Xi = \begin{pmatrix} \Delta\xi \\ \Delta N \end{pmatrix},$$

and let $$r = \frac{\sigma_{\overline{\eta}}^2 + \sigma_{\overline{\eta}}^2 - 2\sigma_{\overline{\eta}\overline{\eta}}^2}{\sigma_{\overline{\eta}}^2\sigma_{\overline{\eta}}^2 - \sigma_{\overline{\eta}\overline{\eta}}^4}, \quad (27)$$

$$p = \frac{\sigma_{\overline{\eta}}^2 - \sigma_{\overline{\eta}\overline{\eta}}^2}{\sigma_{\overline{\eta}}^2 + \sigma_{\overline{\eta}}^2 - 2\sigma_{\overline{\eta}\overline{\eta}}^2} \quad q = \frac{\sigma_{\overline{\eta}}^2}{\sigma_{\overline{\eta}}^2 + \sigma_{\overline{\eta}}^2 - 2\sigma_{\overline{\eta}\overline{\eta}}^2},$$

then $$|\Delta\Xi|^2_{M^T\Sigma^{-1}M} = \Delta\Xi^T\left(M^T\Sigma^{-1}M\right)\Delta\Xi$$

$$= r(\Delta\xi^T, \Delta N^T)\begin{pmatrix} H^T H & pH^T \Lambda \\ p\Lambda H & q\Lambda^2 11 \end{pmatrix}\begin{pmatrix} \Delta\xi \\ \Delta N \end{pmatrix}$$

$$= r[\|H\Delta\xi + p\Lambda\Delta N\|^2 + (q - p^2)\Lambda^2\|\Delta N\|^2]$$

which implies that $-r(q-p^2)\Lambda^2\|\Delta N\|^2/2$ is an upper bound for the exponent of Equation (25).

The determinant $\det(M^T\Sigma^{-1}M)$ is bounded by diagonalizing the matrix $$J = \begin{pmatrix} H^T H & p H^T \Lambda \\ p\Lambda H & q\Lambda^2 \mathbb{1} \end{pmatrix}$$

through an orthogonal transformation $D=U^T JU$. This is always possible since the matrix is symmetric. Any orthogonal matrix U has the same number of rows and columns and satisfies $U^T U=1$. This implies that $$(\det(J^{-1}))^{-1} = \det(J)$$
$$= \det(U^T JU)$$
$$= \det(D)$$
$$= \prod_{i=1}^{k+m} \mu_i(J) \le \left(\max_i \mu_i(J)\right)^{k+m},$$

with $\mu_i(J)$ denoting the i-th eigenvalue of J. The maximal eigenvalue can be bound using Equation (27):

$$\max_i \mu_i(J) = \max_\Xi \frac{\Xi^T J \Xi}{\|\Xi\|^2} \le \max\{\|H\|^2, q\Lambda^2\} + 2|p|\Lambda\|H\|.$$

In the case of a standard geometry matrix with m=4, which shall be considered in the remaining part of the paper, one has the trivial bound $\|H\|^2 \le 2k$ This bound only depends on the satellite number but not on the constellation used. Combining all results leads to the bound $$p(\Delta\Xi) \le \left(\frac{r(\max\{2k, q\Lambda^2\} 2|p|\Lambda\sqrt{2k})}{2\pi}\right)^{\frac{k+4}{2}} \exp\left(-\frac{r}{2}(q-p^2)\Lambda^2\|\Delta N\|^2\right).$$

This bound holds for all values of $\Delta\xi$, and does not depend on the geometry H. The probability of wrong fixing is then easily derived by summing over all possible values of $\Delta N$:

$$p_{wf}(\Delta\xi) = \sum_{\Delta > N, \|\Delta N\| > 0} p(\Delta\Xi) \quad (29)$$

The bound does again not depend on $\Delta\xi$. Explicit values for a constellation of k=7 satellites are provided in Table III. The probability of wrong fixing turns out to be extremely low for smoothing interval as small as 20 seconds. The results shown in Table III imply that determining a float solution by least square and subsequent rounding is an extremely reliable method for fixing the ambiguities in the present context.

The fact that the ambiguity resolution is reduced to a least square solution and rounding, should make the certification of the procedure easier than for other approaches. Also note that the ambiguity needs only be resolved initially or after a major event, such as a loss of synchronization. In an inertial aided three carrier case, this is a very unlikely event.

Once the ambiguities have been fixed, they can be eliminated and the position and clock offset can be determined using the $\Psi$ component, i.e. the upper component alone. The noise performance of the fixed solution is found in Table II. The influence of impairments such as orbit and satellite clock errors, tropospheric delay, ionospheric delays of second order and satellite biases are typically compensated by pseudorange corrections from augmentation systems. In the next two sections, we shall see, however, that the above smoothed code combination also reduces the impact of satellite biases, the ionospheric delay of second order, as well as receiver biases by itself. The latter is discussed first in the next section.

TABLE III

EVALUATION OF THE BOUND ON THE PROBABILITY OF WRONG FIXING $P_{wf}$ AS DESCRIBED BY THE EQUATIONS (29) AS WELL AS (28) IN THE CASE THAT BIASES ARE NOT CONSIDERED, (34) IN THE PRESENCE OF RECEIVER BIASES, AND (38) IN THE PRESENCE OF BIASES THAT MIGHT BE SATELLITE DEPENENT.

| | | | | | $p_{wf}$ | |
|---|---|---|---|---|---|---|
| i | j | k | r | no bias | rec. bias | sat. bias |
| 4 | −5 | 1 | 20 | $8 \cdot 10^{-29}$ | $6 \cdot 10^{-26}$ | $8 \cdot 10^{-20}$ |
| 8 | −9 | 1 | 100 | $1 \cdot 10^{-54}$ | $1 \cdot 10^{-44}$ | $2 \cdot 10^{-40}$ |

ALL CASES ASSUME THAT THERE ARE 7 SATELLITES IN VIEW.

5. Receiver Biases

All results discussed so far are applicable in the absence of biases between the different carrier and code signals. Residual receiver biases might impact the estimation of position and time if the measurements are used without taking differences. The evaluation of Melbourne-Wubbena combinations of measurements by Laurichesse and Mercier has shown that some biases are rather constant over long periods of time, even at the level of a fraction of a wavelength. They, furthermore, found that the biases can be separated into a satellite contribution $w_n^k$ that additionally depends on the receiver class n, and a contribution $u_i$ that depends on the receiver only. The latter is the same for all satellites. The dependence of $w_n^k$ on the receiver class is due to differences in the design of the front-ends and digital filters. The total bias experienced by a receiver i from class n observing signals from satellite k is thus given by $$w_n^k + u_i.$$

In the present section it is assumed that the satellite biases $w_n^k$ are monitored and provided through an external augmentation system. Residual uncorrected contributions are analysed in the next section. The present section addresses the bias $u_i$ induced by the receiver. The user receiver index i will now be dropped in order to reduce the complexity of the expressions in the next steps.

Denote the biases of the code on carrier E5a, E5b and L1 by $u_a$, $u_b$ and $u_1$, respectively, and the corresponding biases of the carriers by $v_1$, $v_b$, and $v_1$ then the bias u experienced by the multicombination smoothed signal $\Psi_S$ is given by (see Equations (8), (6) and (9)):

$$u = au_a + bu_b + cu_1 + (\alpha_2 - \alpha_1)v_a + (\beta_2 - \beta_1)v_b + (\gamma_2 - \gamma_1)v_1. \quad (30)$$

Similarly, the bias of the Hatch smoothed ionosphere-free minimum noise code combination $\psi_S$ is given by $$u' = a'u_a + b'u_b + c'u_1,$$

Equation (23) then becomes $$\begin{pmatrix} \Psi_S \\ \psi_S \end{pmatrix} = \begin{pmatrix} G & 1 \\ G & 1 \end{pmatrix} \begin{pmatrix} \vec{r} \\ c\delta \end{pmatrix} + \Lambda \begin{pmatrix} N \\ 0 \end{pmatrix} + \begin{pmatrix} u1 \\ u'1 \end{pmatrix} + \begin{pmatrix} \bar{\eta} \\ \bar{\eta}' \end{pmatrix}, \quad (31)$$

with G being the spatial part of the geometry matrix H, i.e., the three leftmost columns. Equation (31) is invariant with respect to the transformation $$u \to u + \Delta$$
$$u' \to u' + \Delta$$
$$c\delta \to c\delta - \Delta,$$

which means that a bias common to all satellites and a clock offset cannot be separated. This is also evident from the physical observation that a receiver cannot distinguish a clock offset from a delay in the transmission line. As a consequence, u' can be absorbed in the clock, i.e., it is set to 0. Define w by $$w = \frac{u - u'}{\Lambda}$$
$$= \frac{1}{\Lambda}[(a-a')u_a + (b-b')u_b + (c-c')u_1 + (\alpha_2-\alpha_1)v_a + (\beta_2-\beta_1)v_b + (\gamma_2-\gamma_1)v_1],$$

and let $\Psi_S$ and $\psi_S$ be the biased quantities, then Equation (31) becomes:

$$\begin{pmatrix} \Psi_S \\ \psi_S \end{pmatrix} = \begin{pmatrix} H \\ H \end{pmatrix} \begin{pmatrix} \vec{r} \\ c\delta \end{pmatrix} + \Lambda \begin{pmatrix} N + w1 \\ 0 \end{pmatrix} + \begin{pmatrix} \bar{\eta} \\ \bar{\eta}' \end{pmatrix}, \quad (33)$$

Under the assumption that the equipment biases have been initially calibrated, e.g., using a differential carrier phase solution at the previous airport in the case of an aeronautical scenario, they can be removed from the phase measurements. In this case, w becomes fractional. The float solution to Equation (33) is obtained by a weighted least square estimation of the combined ambiguity and fractional biases N+w1, as described in the previous section for the float solution N. Since the residual bias is fractional, the float solution can be separated into a fixed ambiguity and an estimate of the residual bias. The actual value of the bias is de-weighted whenever the wavelength $\Lambda$ of the linear combination is large. The sharpness of the distribution (25) in the variable $\Delta N$ implies that the estimation of $\Lambda w$ is not very noisy. The estimate is thus used to update a bias filter. The bias filter update and the fixed ambiguity are finally used to determine the fixed solution of the absolute position, as well as the combined clock offset and code bias $c\delta - u'$. In the case of more than 4 satellites the validity of the solution can be verified with a RAIM-type algorithm.

The potential impact of a receiver bias on the probability of wrong fixing can be addressed as follows. Equation (23) is replaced by Equation (33), and thus Equation (27) by $$\|\Delta\Xi\|_{M^T\Sigma^{-1}M}^2 = r\left[\left\|\begin{array}{c}H\Delta\xi + \\ p\Lambda(\Delta N + \omega 1)\end{array}\right\|^2 + (q-p^2)\Lambda^2\|\Delta N + \omega 1\|^2\right].$$

Using $$\|N + \omega 1\| \le \gamma \|N\|$$

with $$\gamma^2 = \max_{N \ne 0} \frac{\|N + \omega 1\|}{\|N\|} \le (1 + |\omega|)^2 + (k-1)\omega^2,$$

for bounding the determinant, again leads to a geometry independent bound:

$$p(\Delta\Xi) \le \left(\frac{r(\max\{2k, q\Lambda^2\gamma^2\} + 2|p|\Lambda\gamma\sqrt{2k})}{2\pi}\right)^{\frac{k+4}{2}} \exp\left(-\frac{r}{2}(q-p^2)\Lambda^2\left\|\begin{array}{c}\Delta N + \\ \omega 1\end{array}\right\|^2\right). \quad (34)$$

This result shows that the probability of wrong fixing is not sensitive to small biases of the combined solution. As a consequence, it is typically beneficial to optimize the coefficients of the linear combination in such a manner that the bias of the desired solution, defined by Equation (30), is minimized. Since the signals in the E5 band can be processed in a manner that minimizes the relative biases, one will aim at combinations that fulfil the conditions $b \cong -a$, and $\beta_2 - \beta_1 \cong -(\alpha_2 - \alpha_1)$. It shall be assumed in the remaining part of the paper that the biases in the E5-Band are identical, i.e. $u_b = u_a$, and $v_b = v_a$. Furthermore, it is meaningful to relate the biases to the standard deviations of the measurements considered:

$$u_x = \chi \sigma_{code_x}, \text{ and } v_x = \chi \sigma_{phase},$$

with $\sigma_{code_x}$, and $\sigma_{phase}$ being the noise standard deviation for the code components, and the phase, respectively, and with $\chi$ being a coefficient, which characterizes the biases. Since biases are not reduced by averaging, one can determine them, and also needs to determine them with an accuracy that is higher than the standard deviation, i.e. $\chi < 1$. The actual values chosen are $\chi = \frac{1}{8}$ in the case $\tau = 20$, and $\chi = \frac{1}{4}$ in the case $\tau = 100$. These values were chosen so that the biases are roughly $\frac{1}{2}$ of the standard deviation of the solution from Table II. The associated probabilities of wrong fixing are listed in Table III. They were obtained using the bound from Equation (34) as well as $\|\Delta N + \omega 1\|^2 \ge v(1 - |\omega|)^2$ for $\|\Delta N\|^2 = v \in \{1,2,3\}$, i.e. for the dominant terms in the sum of Equation (29).

6. Satellite Biases

Satellite dependent biases cannot be eliminated by the transformation used in the previous section, since they contribute differently to the pseudoranges and phases of the different satellites. On the other hand these biases can be significantly suppressed using an augmentation system, as mentioned already. The purpose of the present section is to study the potential impact of residual satellite dependent biases on the probability of wrong fixing.

In the presence of a general bias U, Equation (24) is extended to include that bias:

$$\Psi = M\Xi + U + \eta,$$

with $\eta$ staying zero-mean. In this case, the estimate $\hat{\Xi}$ of $\Xi$ has a bias given by $(M^T\Sigma^{-1}M)^{-1}M^T\Sigma^{-1}U$, which is also the bias of $\Delta\Xi$. The variances stay unaffected. With these modifications, the distribution $p(\Delta\Xi)$ becomes:

$$p(\Delta\Xi) = \frac{1}{\sqrt{(2\pi)^{k+4}\det\left(\left(M^T\sum^{-1}M\right)^{-1}\right)}} \exp\left(-\frac{1}{2}\left\|\Delta\Xi - \left(M^T\sum^{-1}U\right)\right\|^2_{M^T\Sigma^{-1}M}\right).$$

Expanding the exponent and disregarding the term quadratic in U leads to the following upper bound:

$$-\frac{1}{2}(\|\Delta\Xi\|^2_{M^T\Sigma^{-1}M} - 2\Delta\Xi^T M^T\Sigma^{-1}U) \quad (35)$$

Since $\Sigma$ is a non-singular symmetric positive definite matrix $\Sigma^{-1/2}$ exists, and the second term can be bounded using the Cauchy-Schwartz inequality:

$$|\Delta\Xi^T M^T\Sigma^{-1/2}\Sigma^{-1/2}U|^2 \leq \Delta\Xi^T M^T\Sigma^{-1}M\Delta\Xi \cdot U^T\Sigma^{-1}U = \|M\Delta\Xi\|^2_{\Sigma^{-1}}\|U\|^2_{\Sigma^{-1}}.$$

Based on this result the exponent can be bounded by $$-\frac{1}{2}\left\|\Delta\Xi - \left(M^T\sum^{-1}M\right)^{-1}M^T\sum^{-1}U\right\|^2_{M^T\Sigma^{-1}M} \leq -\frac{1}{2}\|M\Delta\Xi\|_{\Sigma^{-1}}\left(\|M\Delta\Xi\|_{\Sigma^{-1}} - 2\|U\|_{\Sigma^{-1}}\right).$$

It is thus sufficient that the bias U fulfils a condition of the form:

$$\|U\|_{\Sigma^{-1}} \leq \kappa\|M\Delta\Xi\|_{\Sigma^{-1}} \quad (36)$$

with a value of $\kappa$ smaller than $\frac{1}{2}$. Equation (27) implies that $\|M\Delta\Xi\|^2_{\Sigma^{-1}} \geq r(q-p^2)\Lambda^2\|\Delta N\|^2$. The norm of U can be evaluated explicitly as follows. Let $$U = \begin{pmatrix} u \\ u' \end{pmatrix}$$

be the decomposition of the bias into the bias of the desired linear combination u and into the bias of the auxiliary solution u', then some simple algebra leads to $$\|U\|^2_{\Sigma^{-1}} = U^T \sum^{-1} U$$

$$= \frac{1}{\det\Sigma} U^T \begin{pmatrix} \sigma\frac{2}{\eta'}11 & \sigma\frac{2}{\eta\eta'}11 \\ \sigma\frac{2}{\eta\eta'}11 & \sigma\frac{2}{\eta'}11 \end{pmatrix} U$$

$$= \frac{1}{\det\Sigma}\left(\sigma\frac{2}{\eta'}\|u\|^2 + \sigma\frac{2}{\eta'}\|u'\|^2 - 2\sigma\frac{2}{\eta\eta'}u'^T u\right)$$

$$= rq\|u\|^2 + r(1-2p+q)\|u'\|^2 - 2r(q-p)u'^T u$$

with r, p, and q as defined in Section 4. Assuming that the largest bias component of u is bounded by b, that the largest bias component of u' is bounded by b' and that there are k satellites, the above bound becomes (by definition q>p):

$$\|U\|^2_{\Sigma^{-1}} \leq kr(qb^2 + (1-2p+q)b'^2 + 2(q-p)b'b) \leq k\max\{b, b'\}^2 r(1+4(q-p)) \quad (37)$$

It is often worthwhile evaluating the first bound. The associated probability of wrong fixing can be several orders of magnitude smaller. Using the Equations (36) and (37), as well as the lower bound on $\kappa\|M\Delta\Xi\|_\Sigma$ leads to the following inequality in the case $\|\Delta N\|>0$:

$$\|U\|^2_{\Sigma^{-1}} \leq kr(qb^2+(1-2p+q)b'^2+2(q-p)b'b) \leq \kappa^2 r(q-p^2)$$
$$\Lambda^2 \leq \kappa^2 r(q-p^2)\Lambda^2\|\Delta N\|^2 \leq \kappa^2\|M\Delta\Xi\|^2_{\Sigma^{-1}}$$

which implies the following sufficient condition for $\kappa$:

$$\kappa^2 \geq \frac{k(qb^2 + (1-2p+q)b'^2 + 2(q-p)b'b)}{(q-p^2)\Lambda^2}.$$

For such values of $\kappa$, the following bound applies:

$$p(\Delta\Xi) \leq \left(\frac{r(\max\{2k, q\Lambda^2\} + 2|p|\Lambda\sqrt{2k})}{2\pi}\right)^{\frac{k+4}{2}} \exp\left(-\left(\frac{1-}{2\kappa}\right)\frac{r}{2}(q-p^2)\Lambda^2\|\Delta N\|^2\right) \quad (38)$$

The result of the evaluation of this bound for the solutions considered is listed in the last column of Table III. The evaluation was performed using the previous assumptions $\chi=\frac{1}{8}$, and $\chi=\frac{1}{4}$ for $\tau=20$ and 100 [s], respectively. The biases of the solutions are listed in Table II. The bias of the second solution includes an L1-bias of 5 [cm], i.e. the bias of the linear combination is 4 times smaller than its largest constituent. The results show that even satellite dependent biases can be controlled rather well. These results were obtained under the assumption that the biases are constant in the E5-band, and that the phase biases can be controlled to millimeter level. The latter assumptions seem reasonable but have not yet been verified to full depth.

7. Second Order Ionospheric Corrections

The elimination of the first order ionospheric delay was a main aspect of the present paper. With the high targeted overall accuracy and the occurrence of large coefficients in the phase combination $\Phi_1$, the corrections of second order could potentially degrade the performance in a non-negligible manner. The size of these corrections on each individual carrier is at most a few centimeters, as reported by Hogue and Jakowski. A model commonly used in the literature for describing the second order corrections is due to Bassiri and Hajj, Let J and $J_\phi$ denote these second order corrections to the code and phase measurements, respectively, then:

$$J = \frac{s}{f^3} \quad (39)$$

$$J_\varphi = -\frac{1}{2}J, \quad (40)$$

with $$s = 7527c \int_{path} d\ln_c \vec{B} \cdot \vec{e},$$

and c denoting the velocity of light, $n_c$ the electron density, $\vec{B}$ the earth's magnetic field, and the unit vector in the direction of wave propagation. The latter is typically approximated by the unit vector pointing from the satellite to the user location, i.e., ray bending is neglected. In this case, s can also be written in the form $$s = \vec{s} \cdot \vec{e},$$

with $\vec{s}$ being a quantity that needs to be mapped like the total electronic content TEC=∫dln$_e$ in the single frequency case. Using these corrections in Equation (8), as well as the definitions $h_a=(154/115)^3$, $h_b=(154/118)^3$, $h_1=1$, and $J=s/f_1^3$ leads to the following overall correction $J_\Psi$:

$$J_\psi(t+1) = \left[\left(a + \frac{\alpha_1}{2}\right)h_a + \left(b + \frac{\beta_1}{2}\right)h_b + \left(c + \frac{\gamma_1}{2}\right)h_1\right]\left[\left(1 - \frac{1}{\tau}\right)\overline{J}(t) + \frac{1}{\tau}J(t+1)\right] - \frac{1}{2}(\alpha_2 h_a + \beta_2 h_b + \gamma_2 h_1)J(t+1),$$

which is further evaluated using the definition $$\Delta J(t) = J(t+1) - \overline{J}(t).$$

$\Delta J$ is the increment with respect to the filtered ionospheric correction. Slant TEC rates of up to 20 TECU/min, have been observed with typical times scales in the order of minutes. This means that $\Delta J(t)$ can be somewhat larger than $J(t+1)-J(t)$, but stays in the same order of magnitude.

By substituting $J(t+1)=\overline{J}(t)+\Delta J(t)$, the second order ionospheric error becomes:

$$J\psi(t+1) = \left[\left(a + \frac{\alpha_1 - \alpha_2}{2}\right)h_a + \left(b + \frac{\beta_1 - \beta_2}{2}\right)h_b + \left(c + \frac{\gamma_1 - \gamma_2}{2}\right)h_1\right]\overline{J}(t) + \left[\left\{-\frac{\alpha_2}{2} + \frac{1}{\tau}\left(a + \frac{\alpha_1}{2}\right)\right\}h_a + \left\{-\frac{\beta_2}{2} + \frac{1}{\tau}\left(b + \frac{\beta_1}{2}\right)\right\}h_b + \left\{-\frac{\gamma_2}{2} + \frac{1}{\tau}\left(c + \frac{\gamma_1}{2}\right)\right\}h_1\right]\Delta J(t)$$

and a similar expression for $J_\Psi(t)$ with a, b, c replaced by a', b', c', and replaced by $\alpha'$, $\beta'$, $\gamma'$. Since these expressions are similar to satellite biases, the analysis of the previous section applies. The result of the numerical evaluation for the two solutions considered in this paper is provided in Table IV. The coefficient of the L1 correction is smaller than 1, and the gradients are suppressed as well. The table also provides the probability of wrong fixing for a second order L1 correction of 4 centimeters, which is a value that is above average but not excessive. The ionosphere was assumed to be static. The simple bounding technique developed here is not sharp enough to cover the full range of possible second order ionospheric phenomena. However, it at least shows that the solution is well behaved for the most frequent second order error magnitudes.

|   |   |   |   | coefficients of | | |
|---|---|---|---|---|---|---|
| i | j | k | r | $\overline{J}(t)$ | $J(t)$ | $p_{wf}$ |
| 4 | −5 | 1 | 20 | 0.87 | 0.33 | $3 \cdot 10^{-12}$ |
| 8 | −9 | 1 | 100 | 0.88 | 0.38 | $7 \cdot 10^{-20}$ |

8. Conclusions

Three carrier linear combinations provide additional degrees of freedom that can be used to eliminate the ionosphere, and minimize the noise at the same time. The consideration of pure code combinations yields some improvement already. The joint consideration of code and carrier combinations in a Hatch filter leads to substantial additional improvements up to sub-decimeter accuracies. At initialization, after cycle slips, or after loss of synchronization integer ambiguities must be resolved. This is comparatively simple, since no differences between satellite measurements are formed. Geometry independent bounds for the probability of wrong fixing were derived. Receiver biases are not eliminated in the scenarios considered, and have correspondingly to be addressed. Investigations by other authors suggest that the receiver biases are satellite independent and rather stable over time. This led to a method for tracking such biases. The impact of small, more general, satellite dependent biases could be limited as well. The second order corrections to the ionospheric delay is such a generalized bias. It is found to be attenuated by the linear combinations considered. The method presented resolves the issue of unpredictable ionospheric variability, which is a major issue in the aeronautical context. The method requires good engineering of satellites and receivers, as well as a moderate level of additional algorithmic complexity. It seems capable of providing the necessary accuracy and integrity for CAT III landing, and potentially also for surface movement. The present paper focussed on the basic principles of the method and on the analysis of individual impairments. In a next step, simulations for realistic scenarios need to be performed, and parameters that are relevant in safety of life services, such as protection levels or the availability of integrity need to be studied. Furthermore, the modeling and estimation of biases should be addressed in more depth.

The invention claimed is:

1. A method for estimating the position of a receiver by carrier smoothing in a global navigational and positioning satellite system using radio signals, comprising at least one ranging code modulated on at least three carriers, wherein the method comprises
   estimating the delay of each code,
   estimating the phase of each carrier,
   combining the code delay estimates,
   smoothing the resulting combination using a combination of at least three carrier phases, which means subtracting a phase combination from the code combination, filtering, and finally adding a phase combination.

2. The method according to claim 1, using the same carrier combination before and after the filter.

3. The method according to claim 1, using ionosphere free combinations for the code and carrier, with a low noise variance.

4. The method according to claim 1, which minimize a noise variance.

5. The method according to claim 1, using different carrier combinations before and after the filter.

6. The method according to claim 1, which uses at least two different smoothed code combinations in order to estimate the user's position, a time-offset like parameter, and the ambiguity resulting from the use of different carrier combinations before and after the filter.

7. The method according to claim 1, which uses least squares estimation to determine a float solution and rounding to determine the integer ambiguity from the float solution.

8. The method according to claim 1, which uses at least two different smoothed code combinations in order to estimate the receiver's position, a time-offset like parameter, receiver biases between the various code and carrier signals.

9. A method for satellite navigation, comprising using at least one ranging code modulated on at least three carriers transmitted from satellites, and performing the method according to claim 1 on each code and carrier for satellite navigation.

10. A method for performing a critical application, comprising using at least one ranging code modulated on at least three carriers transmitted from satellites, and performing the method according to claim 1 on each code and carrier for carrying out a critical application.

11. A method for estimating the position of a receiver, the method comprising:
    performing an ionosphere-free geometry-free linear combination of at least three code based delay measurements and at least three carrier based measurements,
    filtering the ionosphere-free geometry-free linear combination,
    performing an ionosphere-free geometry-preserving linear combination of at least three carrier phase measurements and the filtered ionosphere-free geometry-free linear combination,
    an estimation of estimating ambiguity by establishing an estimation of integer number of multiples of wavelengths inherent in the ionosphere-free geometry-preserving linear combination, and
    determining the position using the estimation and the ionosphere-free geometry-preserving linear combination.

12. The method according to claim 11 with coefficients of the linear combinations optimized in such a manner that the noise is reduced.

13. The method according to claim 11 which uses a second ionosphere-free geometry-preserving smoothed linear combination of at least two code delay measurements in order to estimate the receiver's position, a time-offset like parameter, receiver biases between the various code and carrier signals, and the ambiguity.

14. The method according to claim 11 which uses least squares estimation to determine a float solution and rounding to determine the integer ambiguity from the float solution.

15. A method for satellite navigation, comprising using at least one code modulated on at least three carriers transmitted from satellites, and performing the method according to claim 11 on each code and carrier for satellite navigation.

16. A method for performing a critical application, comprising using at least one code modulated on at least three carriers transmitted from satellites, and performing the method according to claim 11 on each code and carrier for carrying out a critical application.

* * * * *